(12) United States Patent
Bhatia et al.

(10) Patent No.: US 7,701,870 B2
(45) Date of Patent: Apr. 20, 2010

(54) ZERO RATING IN WIRELESS PREPAID COMMUNICATIONS NETWORK

(75) Inventors: Ravideep Bhatia, West Dundee, IL (US); Claudio Taglienti, Barrington Hills, IL (US); Andy Sofronas, Kildeer, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 212 days.

(21) Appl. No.: 11/966,506

(22) Filed: Dec. 28, 2007

(65) Prior Publication Data

US 2009/0168660 A1 Jul. 2, 2009

(51) Int. Cl.
*H04L 12/26* (2006.01)
(52) U.S. Cl. .................................. 370/252; 379/114.01
(58) Field of Classification Search .................. None
See application file for complete search history.

(56) References Cited

U.S. PATENT DOCUMENTS

| | | |
|---|---|---|
| 3,980,939 A | 9/1976 | Greer |
| 4,243,976 A | 1/1981 | Warner et al. |
| 4,385,267 A | 5/1983 | Herbert et al. |
| 4,446,265 A | 5/1984 | Braksmayer et al. |
| 4,677,331 A | 6/1987 | Leitgeb |
| 4,740,883 A | 4/1988 | McCollum |
| 4,937,644 A | 6/1990 | Baliga |
| 5,164,651 A | 11/1992 | Hu et al. |
| 5,349,868 A | 9/1994 | Shoji et al. |
| 5,469,044 A | 11/1995 | Gyugyi et al. |
| 5,483,149 A | 1/1996 | Barrett |
| 5,673,831 A | 10/1997 | Spratt |
| 6,101,113 A | 8/2000 | Paice |
| 6,175,220 B1 | 1/2001 | Billig et al. |
| 6,328,887 B1 | 12/2001 | Toon |
| 6,337,801 B2 | 1/2002 | Li et al. |
| 6,418,435 B1 | 7/2002 | Chase |
| 6,430,104 B1 | 8/2002 | Rosario |
| 6,469,636 B1 | 10/2002 | Baird et al. |
| 6,480,591 B1 | 11/2002 | Penfield et al. |
| 6,507,500 B2 | 1/2003 | Liang |
| 6,982,884 B1 | 1/2006 | Paice |
| 6,983,036 B2 | 1/2006 | Esty et al. |
| 7,105,234 B2 | 9/2006 | Miska |
| 7,115,682 B2 | 10/2006 | Guo et al. |
| 7,233,506 B1 | 6/2007 | Paice |
| 7,248,094 B1 | 7/2007 | McCollum |
| 2004/0190696 A1* | 9/2004 | Fleischer et al. ........ 379/114.01 |

(Continued)

OTHER PUBLICATIONS

3G, "3rd Generation Partnership Project 2 '3GPP2'," Version: 1.0, Feb. 2006, 33 pgs.

*Primary Examiner*—Min Jung
(74) *Attorney, Agent, or Firm*—Leydig, Voit & Mayer, Ltd.

(57) ABSTRACT

This disclosure relates to methods and systems for monitoring network usage according to predetermined rules and calculating user charges based on the network usage. The described technique includes receiving a data packet, extracting parameters from the data packet and determining whether the extracted parameters match at least one rule in a rules engine. Charges for the data packet are calculated based on the matched rules. The data packet is forwarded on to its destination.

20 Claims, 4 Drawing Sheets

U.S. PATENT DOCUMENTS

| | | | |
|---|---|---|---|
| 2006/0008063 A1* | 1/2006 | Harnesk et al. | 379/114.01 |
| 2007/0217581 A1* | 9/2007 | Dai et al. | 379/114.2 |
| 2008/0172236 A1* | 7/2008 | Takala | 705/1 |
| 2009/0144167 A1* | 6/2009 | Calamera | 705/26 |
| 2009/0154674 A1* | 6/2009 | Chu | 379/114.2 |

* cited by examiner

ZERO RATING IN WIRELESS PREPAID COMMUNICATIONS NETWORK

FIELD

This invention relates generally to the field of wireless communications and more specifically to the field of prepaid access to wireless communication networks.

BACKGROUND OF THE INVENTION

Wide area wireless networks allow users to perform a number of tasks using mobile devices. For example, traditional cellular voice applications and voice over internet protocol (VoIP) applications allow users with mobile devices to talk to people on the traditional public switched telephone network (PSTN) or to talk to people also using mobile devices. In addition to voice applications, wireless networks allow users to perform a number of data intensive tasks. For example, users send and receive multimedia messaging service (MMS) messages on mobile devices. Users also send and receive electronic mail (email) and instant messages on mobile devices. In addition to sending messages, users download applications, such as binary runtime environment for wireless (BREW) applications. Users also view traditional World Wide Web hypertext markup pages (web pages) and wireless application protocol (WAP) pages. Additionally, VoIP applications use wireless data networks to transmit voice communications.

With the prevalence of wireless networks, including cellular networks, customers desire flexible payment and billing options. Typically, wireless users are charged a monthly fee for access that includes a predetermined amount of talk time and a predetermined amount of data. If the user exceeds the predetermined quotas, based on their wireless plan, the wireless provider surcharges the user. The surcharge is based on the amount of talk time or the amount of data transmitted that exceeds the user's wireless plan. However, for some services, such as MMS messages, the user may be charged for use of the service and not for the amount of data transmitted. For example, a user may have a wireless plan that allows the user to send a certain number of MMS messages each month without being charged an additional fee. Additionally, the wireless provider may allow the user to browse a catalog of BREW applications without charging the user for browsing the application catalog.

Many users want more flexibility in the ways they pay for and are charged for wireless access. For example, some users prefer to prepay for all wireless network access. In this scenario, users pay for a certain amount of talk time or amount of data usage prior to using the network. The network then tracks the time a user spends talking or using data services and when the user reaches their prepaid limit of talk time or data, the network prevents the user from using additional talk time or data until the user pays for additional voice and/or data.

Using the prepay scheme, network operators must calculate network usage and costs in real time, as the user operates their mobile device. However, network operators currently use simplistic algorithms for determining costs and network usage. Typically, users are constrained to using voice applications or simple services, such as MMS messages. The full range of mobile applications, such as voice, MMS, VoIP, applications, and web browsing are not available to customers that prepay for wireless network access. The absence of the full range of mobile applications available to customers that prepay for wireless network access keeps many users from moving to a prepayment plan for wireless network access.

BRIEF SUMMARY

Embodiments of the invention provide a mechanism for calculating network usage and cost information. In one embodiment, a method for monitoring network usage according to predetermined rules is provided. The method allows for the calculation of user charges based on network usage. The method includes receiving a data packet from a data source at a rules engine. The rules engine comprises a plurality of charging rules based on data packet parameters. The method includes extracting packet parameters from the data packet. Next, it is determined whether the extracted packet parameters match at least one charging rule in the rules engine. User charges are calculated based on whether the extracted packet parameters match a rule in the rules engine. Finally, the data packet is forwarded to its destination.

In an alternative embodiment, a method for calculating user charges based on network usage in a prepaid wireless network environment is provided. The method includes receiving a data packet from a user device at a rules engine. The rules engine comprises a plurality of charging rules based on data packet parameters. A rule in the rules engine is matched to the data packet. Whether the user should be charged for a service for the data packet is determined based on the matched rule. Assets are deducted from a prepaid reserve assets account if the user should be charged for a service for the data packet. Whether the user should be charged for the data packet is determined based on the matched rule. The data packet is deducted from a prepaid data quota if the user should be charged for the data packet. The data packet is forwarded to a data destination.

In another embodiment, a computer readable medium having computer-executable instructions for monitoring network usage according to predetermined rules is provided. The computer readable medium includes instructions that allow for the calculation of user charges based on network usage. The computer readable medium includes instructions for receiving a data packet from a data source at a rules engine. The rules engine comprises a plurality of charging rules based on data packet parameters. The computer readable medium includes instructions for extracting packet parameters from the data packet. Next, the computer readable medium includes instructions for determining whether the extracted packet parameters match at least one charging rule in the rules engine. User charges are calculated based on whether the extracted packet parameters match a rule in the rules engine. Finally, the data packet is forwarded to its destination.

BRIEF DESCRIPTION OF THE SEVERAL VIEWS OF THE DRAWING(S)

While the appended claims set forth the features of the present invention with particularity, the invention and its advantages are best understood from the following detailed description taken in conjunction with the accompanying drawings, of which:

DETAILED DESCRIPTION

The following examples further illustrate the invention but, of course, should not be construed as in any way limiting its scope.

This disclosure relates to methods and systems for monitoring network usage according to predetermined rules and calculating user charges based on the network usage. The described technique includes receiving a data packet, extracting parameters from the data packet and determining whether the extracted parameters match at least one rule in a rules engine. Charges for the data packet are calculated based on the matched rules. The data packet is forwarded on to its destination.

Figure 1:
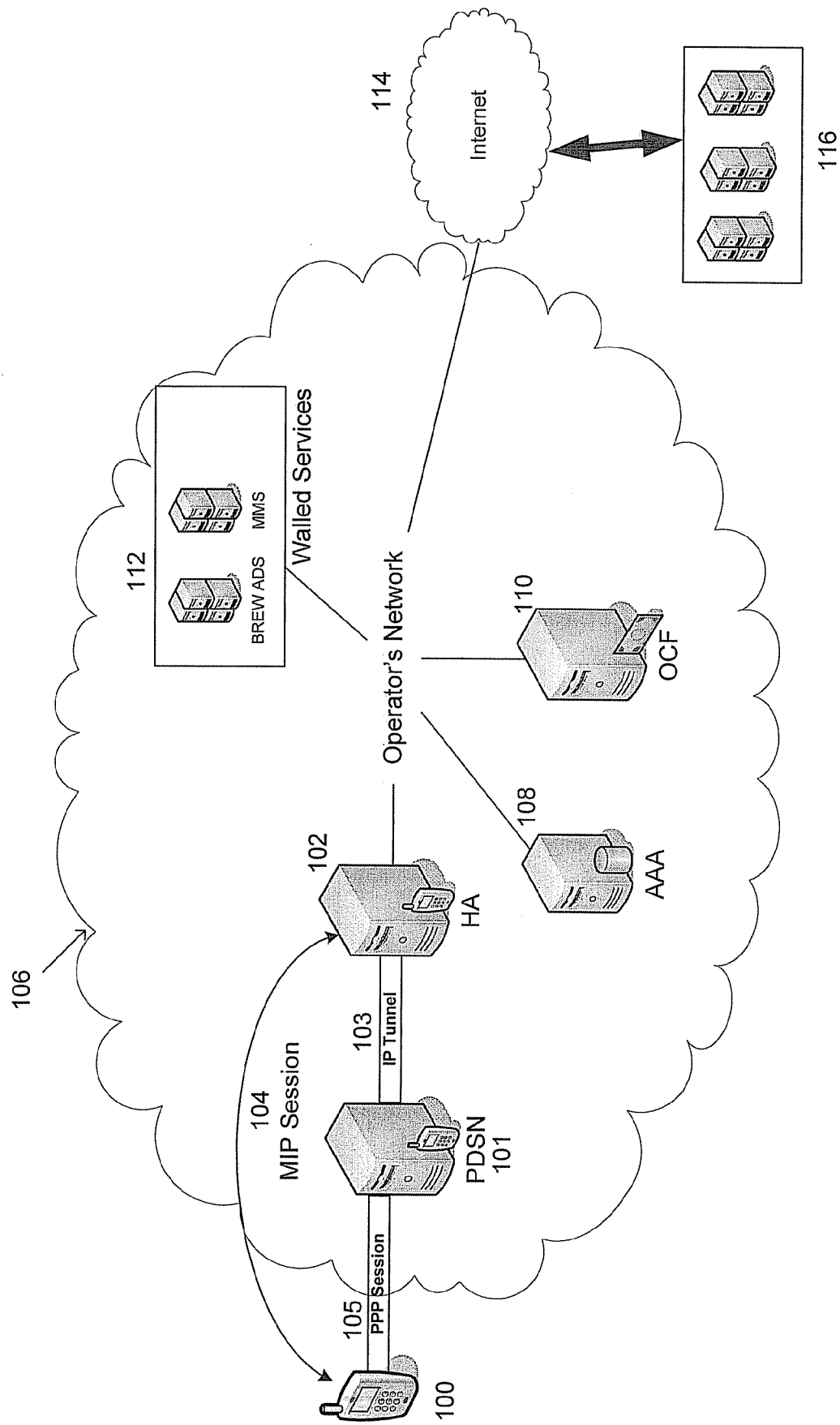
FIG. 1 is a schematic diagram illustrating an exemplary implementation of a third generation wireless network including various network operator services.

Referring now to the drawings, FIG. 1 illustrates an implementation of a third generation wireless network including various network operator services. Although the illustrated embodiment is a third generation mobile network, the disclosed system and methods can be implemented in any appropriate network environment. One exemplary network environment is implemented based on the third generation partnership project 2 (3GPP2). The 3GPP2 defines a third generation (3G) mobile phone system specification within the scope of the International Telecommunication Union (ITU) International Mobile Telecommunications-2000 (IMT-2000) standard. Additional exemplary network environments include GSM, GPRS, EDGE, UMTS, HSPA and FOMA networks.

The exemplary network illustrated in FIG. 1 uses a 3GPP2 network architecture. In this embodiment, a user device 100 is a mobile device, such as a wireless telephone or a portable computer capable of wireless communication with at least one radio access network (not illustrated). In the exemplary embodiment, the user device 100 interfaces with a home agent (HA) 102 by establishing a mobile internet protocol (MIP) session 104. The MIP session 104 can be established over any combination of networks between the user device 100 and the home agent 102. For example, in one embodiment the system establishes the MIP session 104 over a radio access network to the home agent 102. The Internet Engineering Task Force (IETF) established MIP as a standard communications protocol that allows mobile devices to move from one network to another while maintaining a permanent IP address. The home agent 102 stores information relating to each mobile device, such as user device 100, whose permanent IP address is in the home agent's network. In the illustrated embodiment, the user device 100 communicates with its associated home agent 102 by forming a PPP session 105 with a PDSN 101. The PDSN 101 is a packet data serving node. The PDSN 101 forms a connection between the user device 100 and IP networks. In the exemplary embodiment, the PDSN 101 connects to the user device 100 through PPP session 105. Likewise the PDSN 101 connects to the home agent 102 through the IP tunnel 103. Thus, MIP session 104 is created between the user device 100 and the home agent 102. The MIP session 104 allows the home agent 102 and user device 100 to communicate by embedding a primary IP packet inside of other IP packets. Tunneling allows IP packets to travel through intermediary networks. The home agent 102 exists within the wireless operator's network 106. Therefore, in the illustrated embodiment, primary IP packets are exchanged between the operator's network and the user device 100 through the PPP session 105 and the IP tunnel 103.

After receiving IP packets from the user device 100, the home agent 102 can forward the packets to their destination. The authentication, authorization and accounting function 108 provides IP functionality that supports authentication, authorization and accounting for devices, such as user device 100. In the illustrated embodiment, IP packets from the user device 100 pass through the MIP session 104 to the operator's network 106 and the home agent 102. The home agent 102 forwards the packets or parameters from the packets to the authentication, authorization and accounting function 108. The online charging function 110 allows the network operator to offer prepaid wireless services. After a packet reaches the operator's network 106 from the user device 100, the packet may be passed to the online charging function 110 which calculates user charges for the packet and updates the user's account balance. The online charging function 110 is further discussed with reference to FIG. 2 below.

Many network operators provide a number of walled services 112 for users. These walled services 112 include functionality that a user can obtain only through the network operator or can obtain much more easily through the network operator than from other third parties. Exemplary walled services include multimedia messaging service (MMS) and binary runtime environment for wireless (BREW) applications. MMS messages are often sent to and from mobile phones, but can be sent to other devices, such as computers attached to a network. Network operators often charge for MMS messages. For example, a network operator may charge a flat fee to send a fixed number of MMS messages in a give time. Alternatively, a network operator may charge a fee for each MMS message sent from a user device 100. MMS allow users to include multimedia objects, such as images or video, with the message. Another exemplary walled service is a BREW application. BREW applications are small programs that can be downloaded to user devices, such as cellular telephones. Typical BREW applications include games, messaging applications and mapping applications. Network operators typically charge for BREW applications. For example, operators may charge a one time fee to download the application or may charge a recurring fee for use of the application. In the embodiment illustrated in FIG. 1, the walled services 112 include BREW applications and MMS. However, any walled service can be included.

In addition to staying within the operator's network 106, the exemplary network illustrated in FIG. 1 allows users to access the internet 114. In order to access the internet, the user device 100 communicates with the home agent 102 through the MIP session 104. Data packets can then be passed from the operator's network 106 to the internet 114. Once on the internet 114, users can access third party services 116. For example, using the user device 100, users can surf web pages, view maps, check email or purchase goods.

Figure 2:
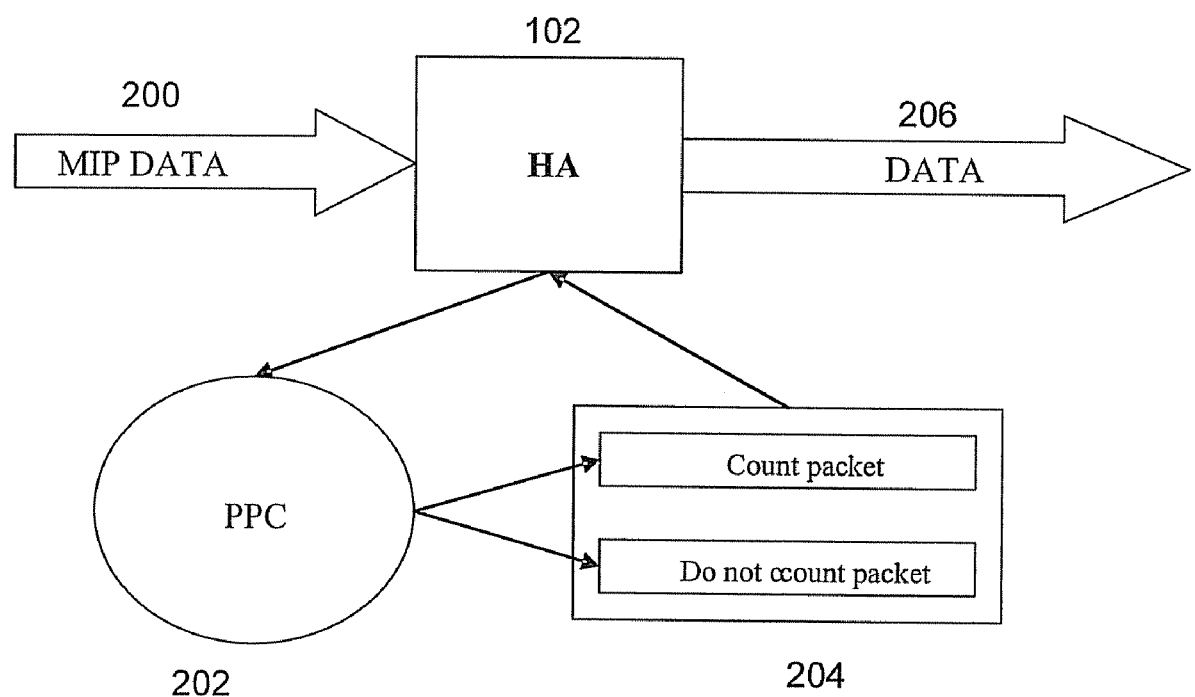
FIG. 2 is a block diagram illustrating an exemplary implementation of a processing flow for prepaid client filter rules including zero rating.

Referring now to FIG. 2, a block diagram illustrating an exemplary implementation of a processing flow for prepaid client filter rules including zero rating is shown. In the exemplary embodiment, MIP data 200 enters the home agent 102. The MIP data 200 may originate at a user device 100 and travel through a MIP session 104 (FIG. 1). The home agent 102 applies filtering rules to determine whether a user should be charged for the MIP data 200. If a MIP data 200 packet should not be charged, it is zero rated. A zero rating indicates that the user is not specifically charged for the packet. However, the user may still pay for access to the service that the user is accessing.

In an exemplary embodiment, the home agent 102 is responsible for counting bytes that are transferred through it. Additionally, the home agent 102 tracks a quota that is assigned to it. The quota defines the amount of prepaid services that have been allocated to the home agent 102 for a particular user. The home agent 102 receives the quota from the authentication, authorization and accounting function 108 (FIG. 1). If a packet is zero rated, then the home agent does not count that packet against the quota. If the home agent 102 determines that it is over its quota, the home agent 102 requests more quota from the authentication, authorization and accounting (AAA) function 108. In the exemplary embodiment, the AAA 108 contains a prepaid server that manages assigning prepaid quotas to the home agent 102. If the prepaid server determines that a user has depleted their prepaid balance, the prepaid server may not assign any additional quota to the home agent 102 for the particular user.

In the exemplary embodiment, the home agent 102 passes parameters from an incoming data packet to a prepaid client 202. The prepaid client 202 contains a rule engine. The rule engine matches the parameters of an incoming data packet, passed from the home agent 102, with the rules that are configured in the rule engine. The rules can be IP based, HTTP based or based on other packet parameters. Using the rules, the prepaid client 202 decides whether the packet should be counted towards the quota assigned to the home agent 102 by the AAA function 108. Messages 204 containing information on whether or not the packet should be counted are passed from the prepaid client 202 to the home agent 102. If sufficient quota exists, the data packet continues towards its destination 206. In one embodiment, the prepaid client 202 exists within the home agent 102. In this embodiment, the data packet parameters and messages 204 are passed logically within the home agent between, for example, functions or objects. In other embodiments, the prepaid client 202 can exist as its own function or as part of another function such as the PDSN 101.

Figure 3:
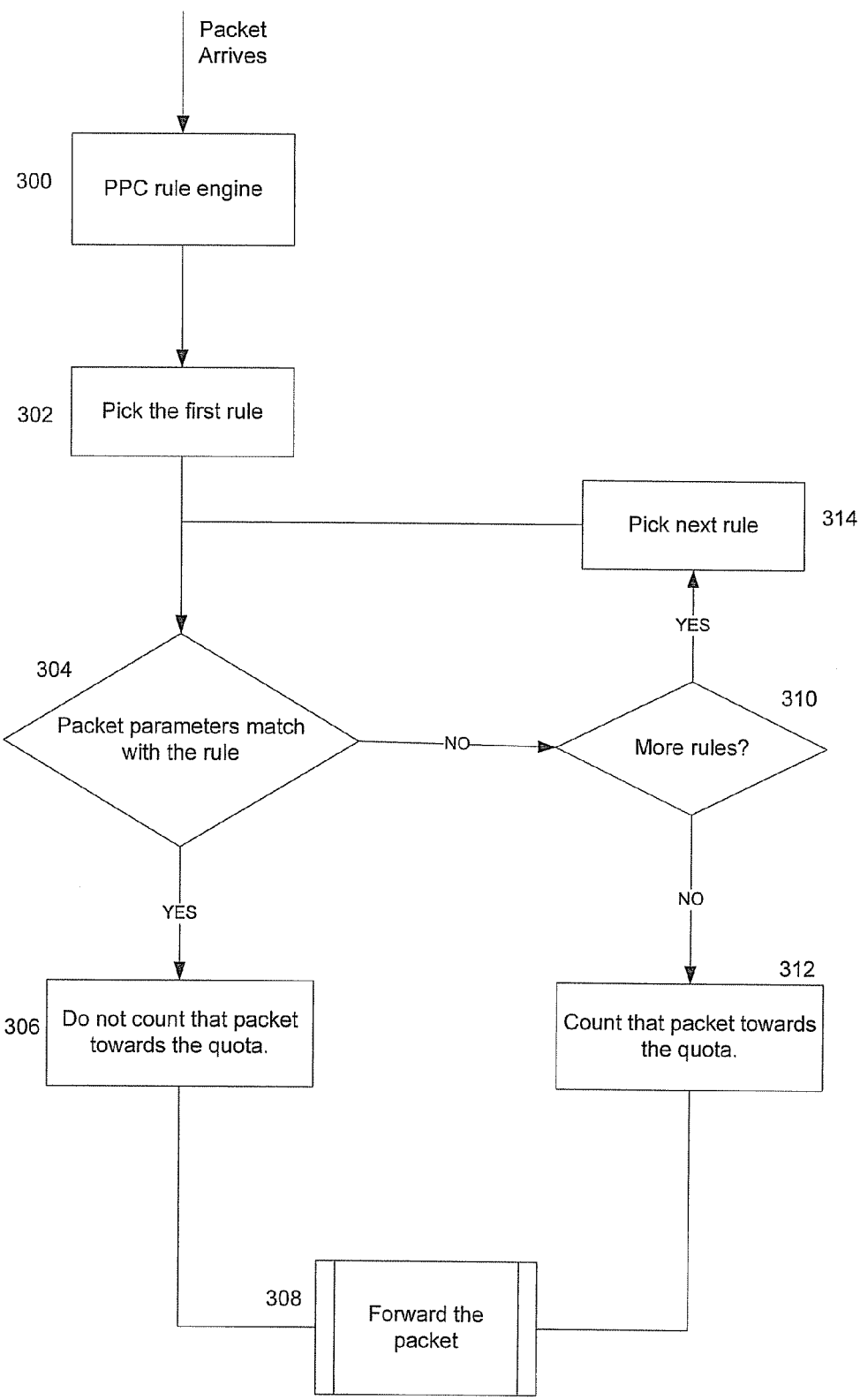
FIG. 3 is a flowchart illustrating an embodiment of a processing flow for internet protocol packets in a prepaid client rule engine.

FIG. 3 illustrates an embodiment of a processing flow for internet protocol packets in a prepaid client rule engine. At step 300, a data packet arrives at the prepaid client rule engine. As shown in FIG. 2, in one embodiment, the data packet first arrives at the home agent 102 and the home agent 102 passes either the entire data packet or relevant packet parameters to the prepaid client 202. Therefore, at step 300 either the entire data packet or relevant parameters from the data packet are received. During step 302 the engine picks the first rule and at step 304 the system determines whether the packet parameters match the rule. If the data packet parameters match the rule, then the system moves to step 306 and the data packet is not counted towards the user's prepaid quota. During step 308, the system forwards the data packet towards its destination.

If during step 304 the data packet parameters do not match the rule, then the system checks at step 310 whether there are any additional rules in the rules engine. If there are no additional rules, then the system counts the packet towards the quota during step 312. In the illustrated embodiment, the system reaches step 312 when no rules match the data packet parameters.

If during step 310 there are additional rules, then the system enters step 314. During step 314 the rules engine loads the next rule. After step 314, the system returns to step 304 and checks to see if the data packet parameters match the rule loaded during step 314. In the embodiment illustrated in FIG. 3, the rules engine moves through the rules linearly, checking the data packet parameters against a first rule and the then loading each rule in turn. However, in alternative embodiments, various algorithms are implemented in the rules engine for checking the data packet parameters against the rules.

A number of charging scenarios exist for charging wireless users for data in a prepaid wireless system. In a first scenario, the user is not charged for either data consumption or for the underlying service. For example, if the user is browsing a catalog of BREW applications that are available for purchase, the wireless operator may not charge for either the data consumption or the right to browse the catalog. Applying the method shown in FIG. 3 to this scenario, one of the rules during step 304 will match the data packet parameters. Therefore, the system will move to step 306 and the packet will not be counted towards the user's prepaid quota. In one embodiment, the system may examine the packet's uniform resource locator (URL) and determine that the packet is destined to a URL for which the user should not be charged. For example, the URL may indicate the packet is destined for the BREW applications catalog.

In some embodiments, the user can transmit and receives packets to a free service even if the user has no remaining prepaid quota. Using the above example, a user may be able to browse the BREW catalog even if the user has no remaining prepaid quota. In this scenario, the home agent 102 should forward the packets to their destination. Therefore, the home agent 102 should check the prepaid client rules in the prepaid client 102 before checking whether any prepaid quota is available.

In a third scenario, a user is charged for both data and the use of the underlying service. For example, when purchasing a BREW application, the user may be charged for the application at the time it is downloaded. Additionally, the user may be charged for the data required to transfer the application to the user device 100. In this scenario, no rule in the rule engine will match the data packet parameters at step 304 (FIG. 3). Therefore, the prepaid client 202 (FIG. 2) count the packets towards the quota that is assigned to it.

In a fourth scenario the user should be charged for both the data and the underlying service, but insufficient prepaid funds exist in the user's prepaid account. In this scenario, when the user does not have sufficient funds, the user will not be allowed to access the service. For example, when a user requests a BREW application download from the BREW application server, the application server sends a command to the online charging function 110 (FIG. 1) to reserve the cost of the application from the users account. If sufficient funds are not available, then the online charging function rejects the request from application server. The application server then sends a message to the client indicating that the application download request is rejected because the user does not have sufficient fluids in its account. Therefore, the user is unable to download the application and the user is not charged for the application.

Figure 4:
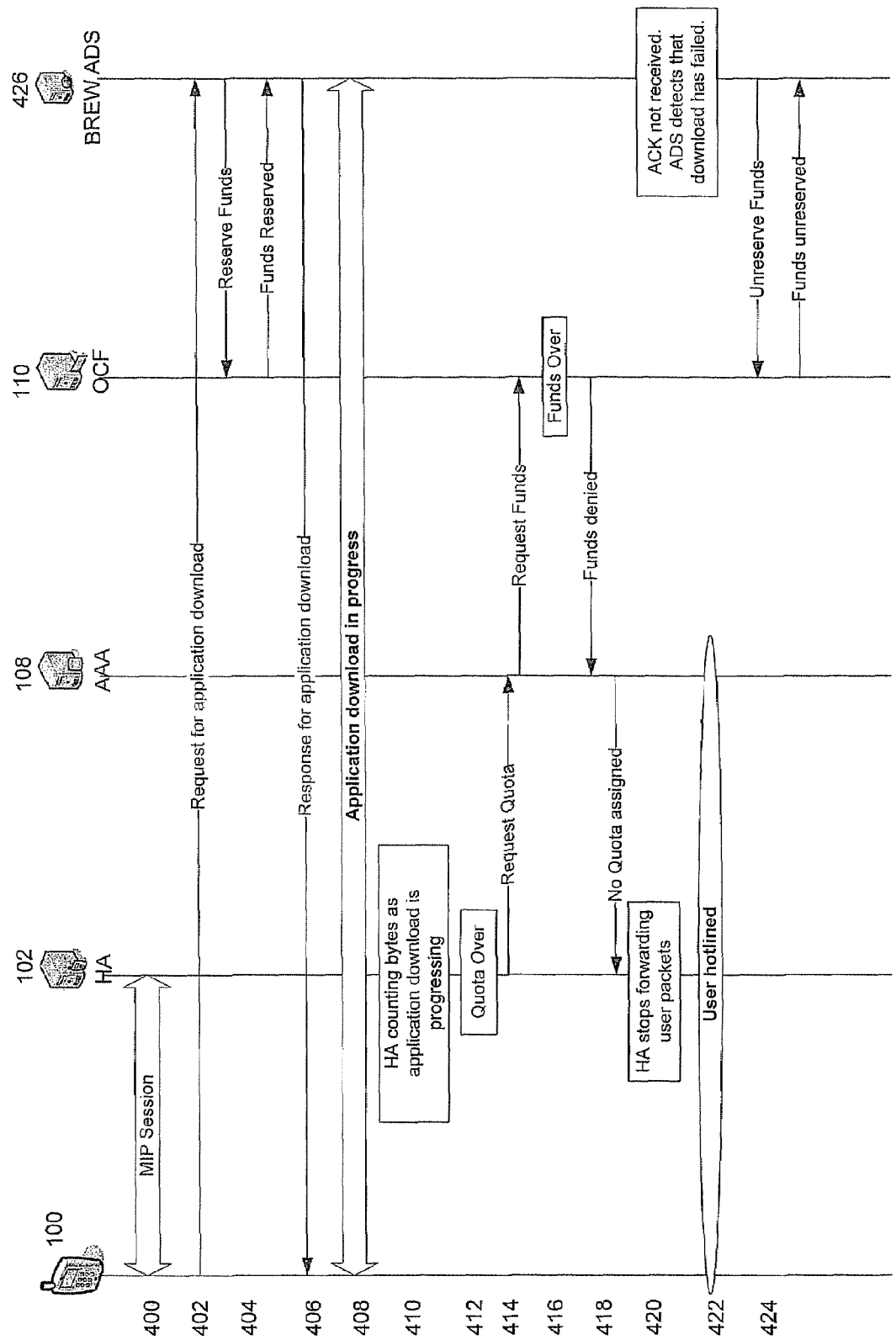
FIG. 4 is a chart illustrating the response to insufficient finds during the download of an application to a prepaid mobile device.

In a fifth scenario, as illustrated in FIG. 4, the user is initially charged for both the data and the service, but an insufficient data quota is reached during use of the service. In this scenario, user device 100 initiates a MIP session with the home agent 102 during time period 400. The user device 100 requests access to walled service during time period 402. For example, the user device may be requesting to download a BREW application from a BREW application server 426. During time period 404, the BREW application server 426 reserves funds from the online charging function 110. The online charging function 110 checks the available funds and determines that the user's prepaid account contains sufficient funds. Therefore, the online charging function 110 allocates funds to the BREW application server 426. During time period 406, the BREW application server 426 responds to the user device 100 that the application is ready for download.

During time period 408, the user device 100 begins downloading the application form the BREW application server 426.

During time period 410, as the application downloads to the user device 100, the home agent 102 counts the bytes of data packets travelling between the user device 100 and the BREW application server 426. As data packets are being transferred, the home server detects that the allocated data quota has been exhausted during time period 412. As a result of the exhausted quota, during time period 414, the home agent 102 requests additional quota from the authentication, authorization and accounting function 108. The authentication, authorization and accounting function 108 then requests additional funds from the online charging function 110. During time period 416, the online charging function 110 determines that the user does not have any prepaid funds remaining in their account. Therefore, during time period 418, the online charging function 110 notifies the authentication, authorization and accounting function 108 that funds have been denied. As a result, the authentication, authorization and accounting function 108 notifies the home agent 102 that no additional quota will be assigned.

Because no additional quota will be assigned, the home agent 102 stops forwarding data packets to and from the user device 100 related to the BREW application download. Therefore, during time period 422, the user account is hotlined or suspended, preventing further viewing of items and services that are not free until the user deposits additional funds in the prepaid account. Because the BREW application download did not complete successfully, the BREW application server 426 will not receive an acknowledgment from the user device 100. Therefore, the BREW application server 426 will detect that the download was not completed. In one embodiment, during time period 424, after detecting that the application download failed, the BREW application server 426 sends a message to the online charging function 110 to unreserve the funds for the application. Thus the funds reserved during time period 404 are available again. In this way, the user is only charged for applications that are successfully downloaded to the user device 100.

In an alternative embodiment, the PDSN 101 tracks data usage rather than the home agent 102. For example, the user device 100 may initiate a simple IP (SIP) call that is handled by the PDSN 101 rather than the home agent 102. After forming the SIP session with the PDSN 101, the data may be accounted for as illustrated in FIG. 4 at time periods 402 through 424, but with the PDSN 101 counting bytes as data is used.

In a sixth scenario, the user is charged for a service, but not for data. In this scenario the user is charged only for the service provided and not for data that is associated with that service. One example service that an operator may choose to charge for the service, but not for the data is MMS. In the case of MMS the user is charged only for sending the MMS message and not charged for the data access. In this scenario, the home agent 102 or prepaid client 202 has a rule in the rules engine indicating that any data packet that belongs to the MMS service should not be counted towards the data quota. The application server hosting the service, for example the MMS server, is responsible for charging the user account for the service provided.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for monitoring network data usage according to predetermined rules to calculate user charges based on the network data usage, the method comprising:
   receiving a data packet from a data source at a rules engine, the rules engine comprising a plurality of charging rules based on data packet parameters;
   extracting packet parameters from the data packet;
   determining whether the extracted packet parameters match at least one charging rule in the rules engine;
   calculating user charges based on whether the extracted packet parameters match the at least one charging rule in the rules engine, wherein calculating the user charges comprises maintaining a data quota for the user at a predetermined level so as to forego charging the user for the data packet based on whether the extracted packet parameters match the at least one charging rule; and
   forwarding the data packet to a data destination.

2. The method of claim 1 wherein calculating the user charges further comprises reducing the data quota by an amount of data corresponding to the data packet so as to charge the user for the data packet based on whether the extracted packet parameters match the at least one charging rule.

3. The method of claim 1 further comprising determining if insufficient funds exist in at least one of a prepaid reserve account and a prepaid data quota for the data packet.

4. The method of claim 3 further comprising preventing the data packet from reaching the data destination.

5. The method of claim 1 wherein the data source is a wireless device.

6. The method of claim 5 wherein the wireless device is a cellular telephone.

7. The method of claim 1 wherein the determining step further comprises matching a destination address with at least one rule in the rules engine.

8. A method for calculating user charges based on network data usage in a prepaid wireless network environment, the method comprising:
   receiving a data packet from a user device at a rules engine, the rules engine comprising a plurality of charging rules based on packet parameters;
   matching a rule in the rules engine to the data packet;
   determining whether the user should be charged for a service for the data packet based on the matched rule;
   deducting assets from a prepaid reserve assets account if the user should be charged for the service for the data packet;
   determining whether the user should be charged for the data packet based on the matched rule;
   deducting the data packet from a prepaid data quota if the user should be charged for the data packet; and
   forwarding the data packet to a data destination.

9. The method of claim 8 further comprising identifying whether the data packet is associated with a service.

10. The method of claim 9 further comprising determining whether data packets are included in a charge for the service.

11. The method of claim 8 further comprising preventing the data packet from reaching the data destination if at least one of the prepaid reserve assets or the prepaid data quota contains insufficient assets.

12. The method of claim 8 wherein the user device is a wireless device.

13. The method of claim 12 wherein the wireless device is a cellular telephone.

14. A computer readable medium having stored thereon computer-executable instructions for monitoring network data usage according to predetermined rules to calculate user charges based on the network data usage, the computer-executable instructions comprising:
   instructions for receiving a data packet from a data source at a rules engine, the rules engine comprising a plurality of charging rules based on data packet parameters;
   instructions for extracting packet parameters from the data packet;
   instructions for determining whether the extracted packet parameters match at least one charging rule in the rules engine;
   instructions for calculating user charges based on whether the extracted packet parameters match the at least one charging rule in the rules engine, wherein calculating the user charges comprises maintaining a data quota for the user at a predetermined level so as to forego charging the user for the data packet based on whether the extracted packet parameters match the at least one charging rule; and
   instructions for forwarding the data packet to a data destination.

15. The computer readable medium of claim 14 wherein the computer executable instructions further comprise instructions for charging at least one of a prepaid reserve account and a prepaid data quota for the data packet.

16. The computer readable medium of claim 14 wherein the computer executable instructions further comprise instructions for determining if insufficient finds exist in at least one of a prepaid reserve account and a prepaid data quota for the data packet.

17. The computer readable medium of claim 16 wherein the computer executable instructions further comprise instructions for preventing the data packet from reaching the data destination.

18. The computer readable medium of claim 14 wherein the data source is a wireless device.

19. The computer readable medium of claim 18 wherein the wireless device is a cellular telephone.

20. The computer readable medium of claim 14 wherein the instructions for the determining step further comprise matching a destination address with at least one rule in the rules engine.

* * * * *